N. W. STORER.
SYSTEM OF CONTROL.
APPLICATION FILED MAY 26, 1917.
1,412,545.
Patented Apr. 11, 1922.
7 SHEETS—SHEET 5.
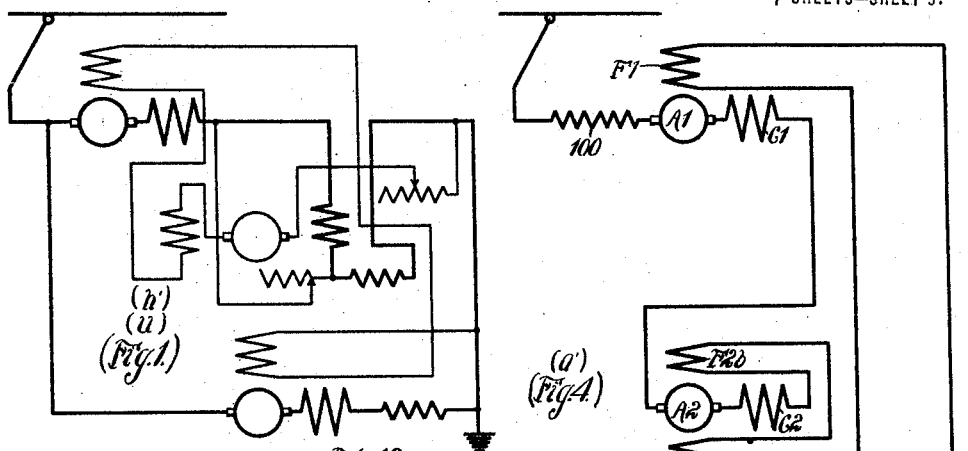
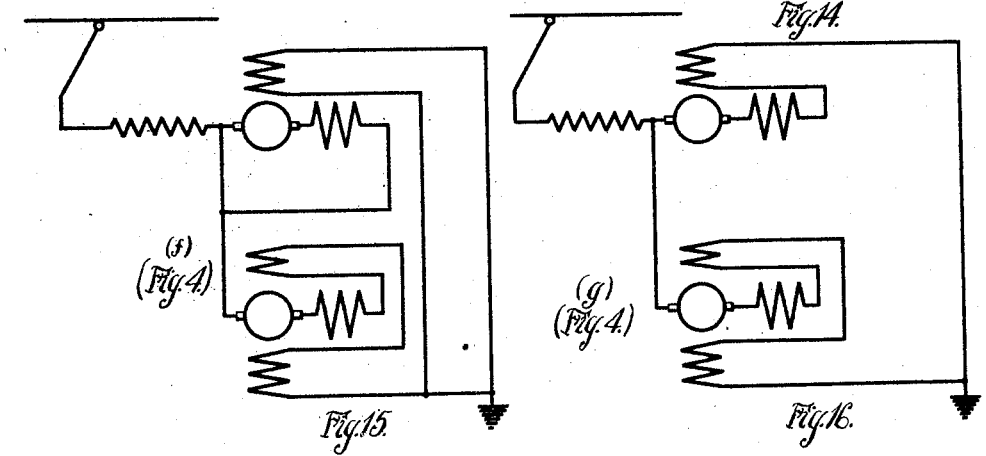
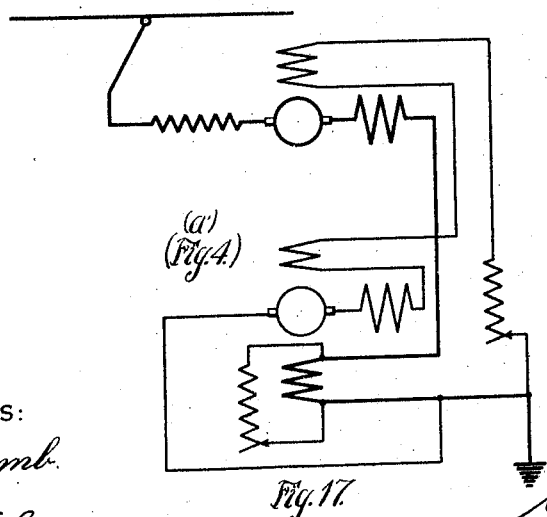
WITNESSES:
INVENTOR
Norman W. Storer.
BY
ATTORNEY

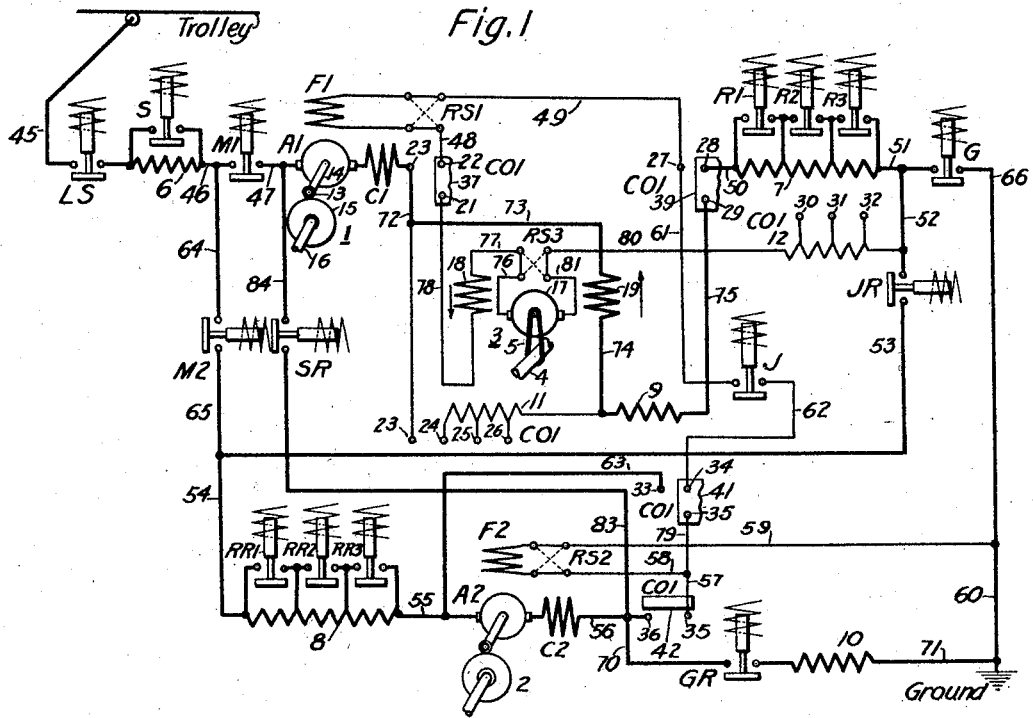
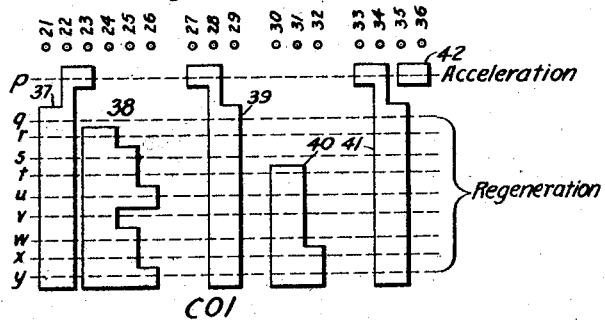

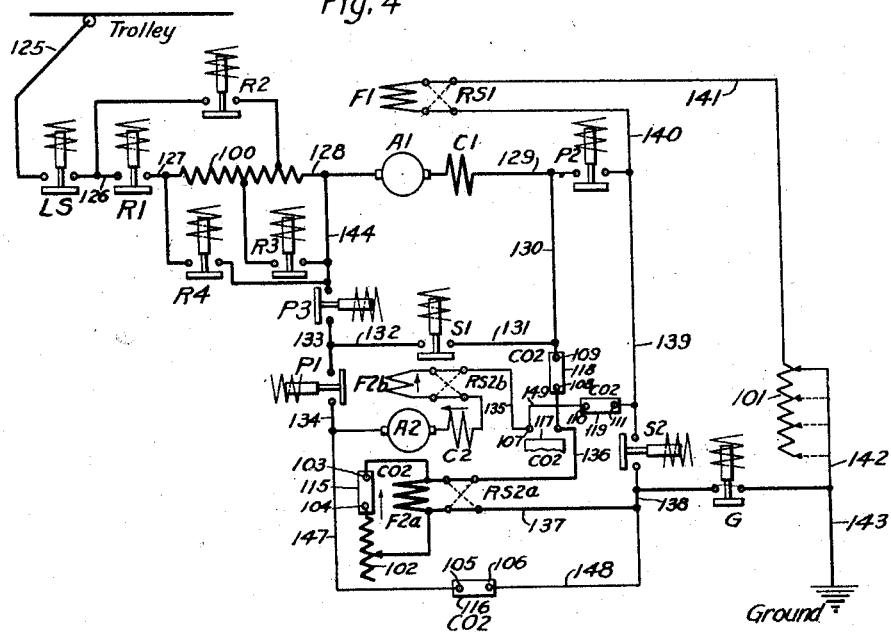

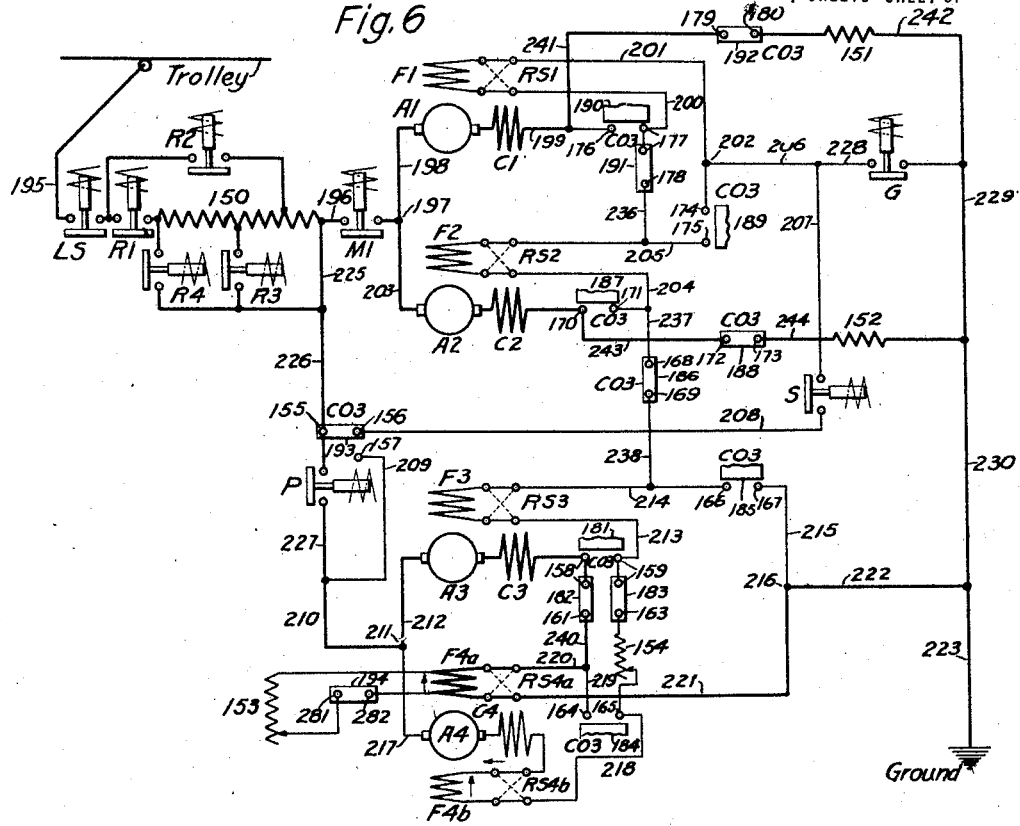

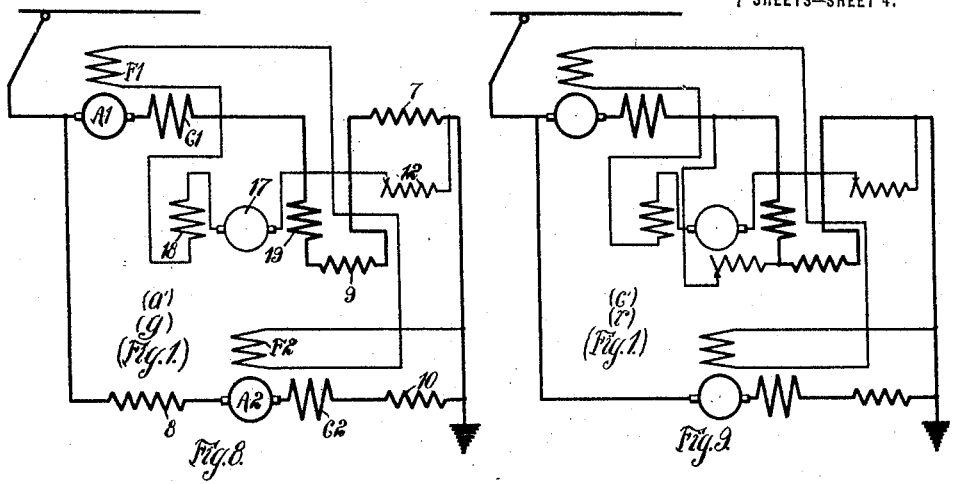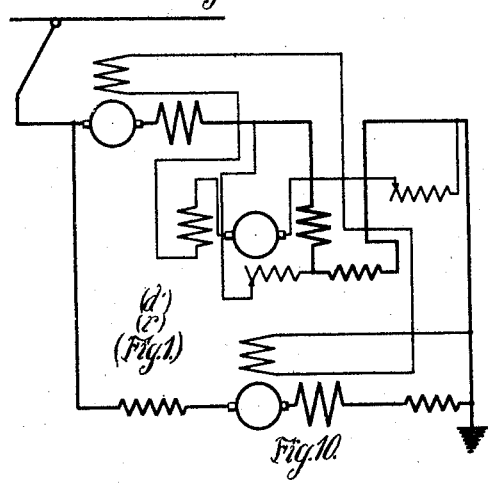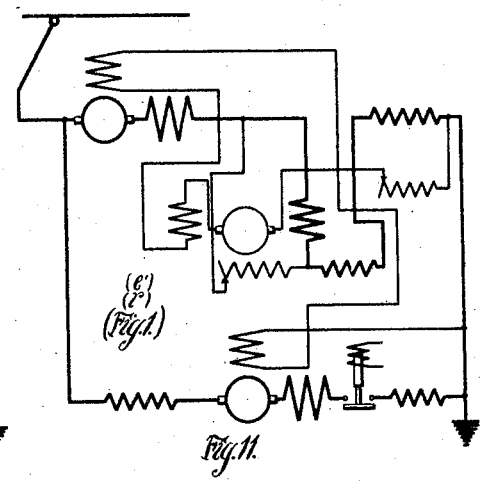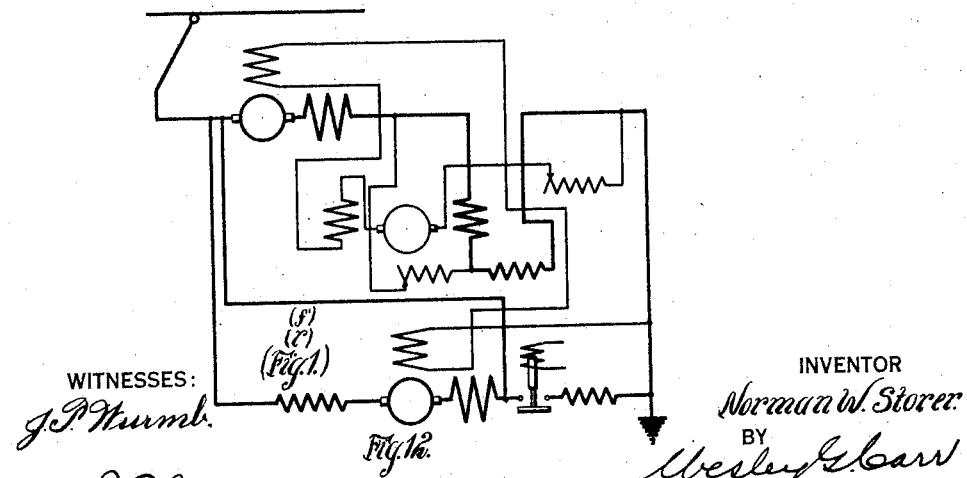

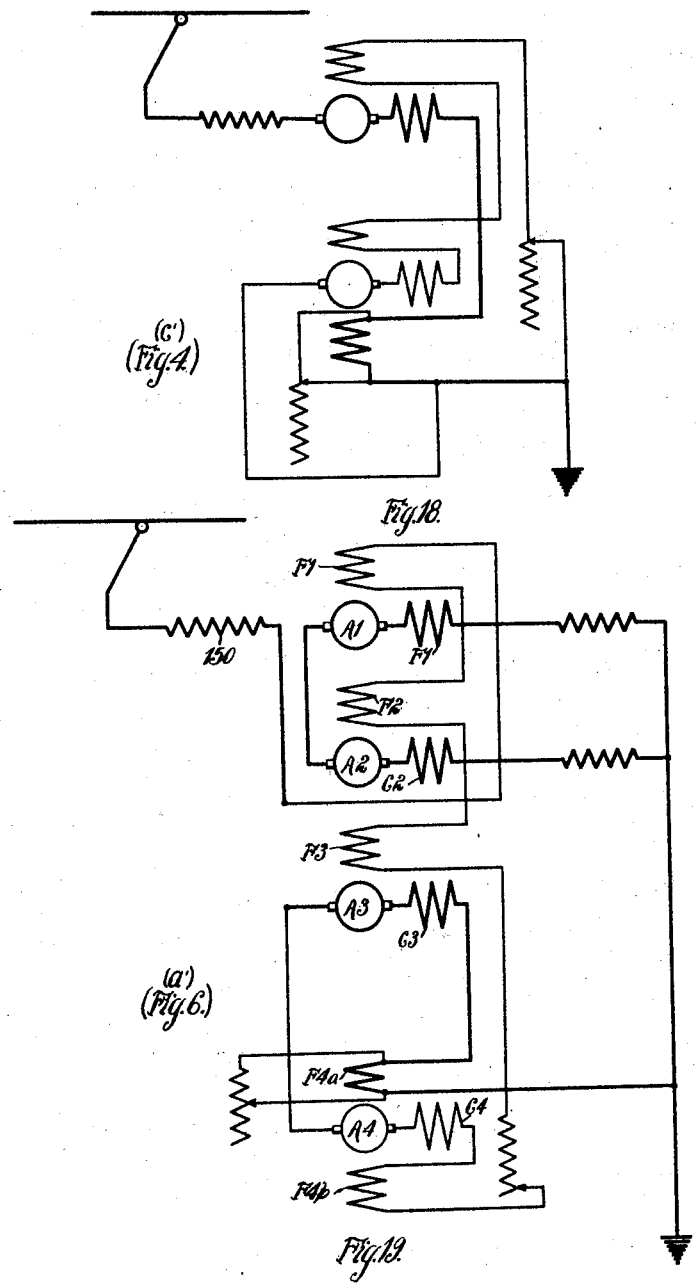

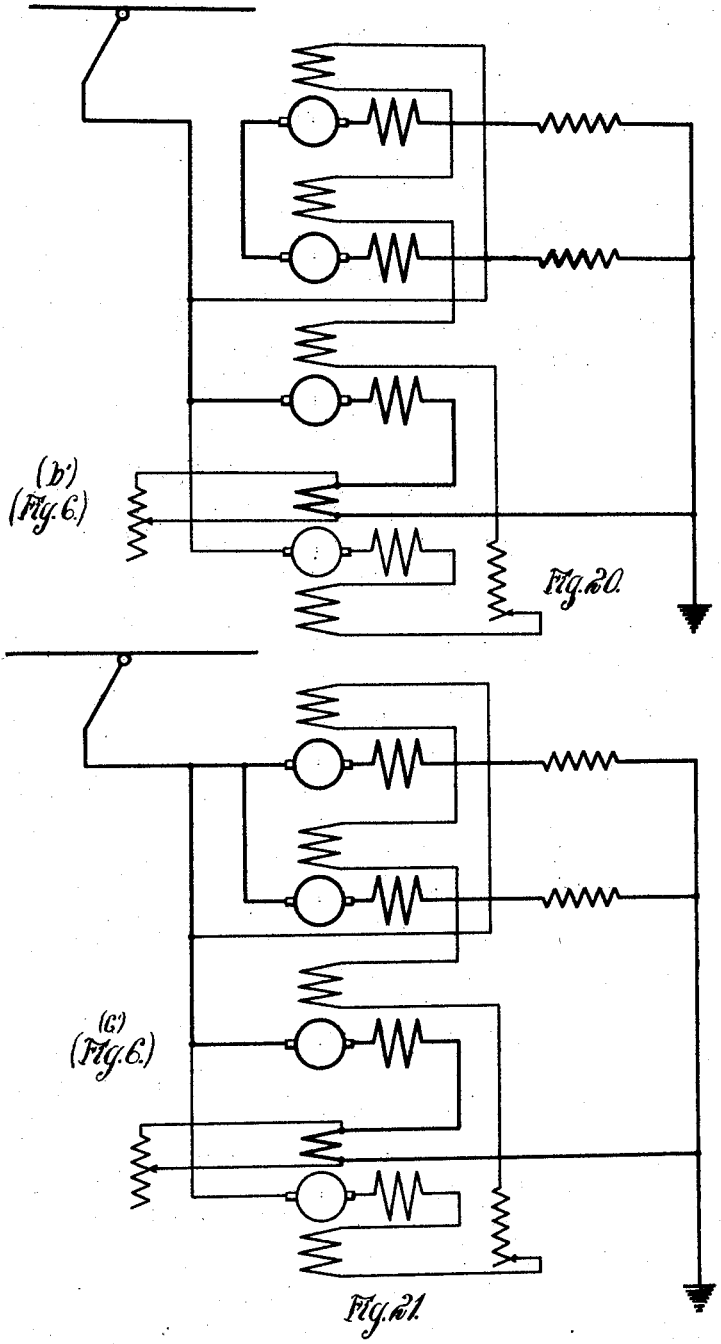

UNITED STATES PATENT OFFICE.

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,412,545.  Specification of Letters Patent.  Patented Apr. 11, 1922.

Application filed May 26, 1917. Serial No. 171,151.

*To all whom it may concern:*

Be it known that I, NORMAN W. STORER, a citizen of the United States, and a resident of Pittsburgh, in the county of Allegheny and State of Pennsylvania, have invented a new and useful Improvement in Systems of Control, of which the following is a specification.

My invention relates to systems of control and especially to the regenerative control of electric vehicle motors and the like.

One object of my invention is to provide a system of the above-indicated character embodying a plurality of main momentum-driven dynamo-electric machines, separate excitation for the regenerating machine or machines being furnished either by one of the main machines itself or by an auxiliary machine that is rotatable with the main machines, for example, being driven from a truck axle.

A further object of my invention is to provide a single switching device for simultaneously closing the main-armature or regenerative circuits and the main-field-winding or exciting circuits, whereby current surges, "flash-over" difficulties, etc., which would ensue upon the closure of such circuits at different times, are precluded, as hereinafter more fully set forth.

Other minor objects of my invention will be described in detail in the following specification and are set forth in the appended claims.

My invention may best be understood by reference to the accompanying drawings, wherein Fig. 1 is a diagrammatic view of the essential main and auxiliary circuits of a system of control embodying my present invention; Fig. 2 is a diagrammatic view of the complete change-over switch for completing certain of the circuits of Fig. 1, as conventionally illustrated therein; Fig. 3 is a sequence chart of well-known form, indicating the preferred order of closure of the various switches shown in Fig. 1 during both the accelerating and the regenerating periods; Fig. 4 is a diagrammatic view of a modified form of control system embracing the principles of the present invention; Fig. 5 is a complete sequence chart corresponding to Fig. 4; Fig. 6 is a diagrammatic view of a further modification of the control system shown in Fig. 1; Fig. 7 is a complete sequence chart corresponding to Fig. 6; Fig. 8 to Fig. 13, inclusive, are simplified diagrammatic views illustrating various sets of circuit connections for Fig. 1, in accordance with the accompanying designations; Fig. 14 to Fig. 18, inclusive, are similar views corresponding to the circuits of Fig. 4; and Fig. 19, Fig. 20 and Fig. 21 are views of a like character having reference to Fig. 6.

Referring to Fig. 1 of the drawings, the system shown comprises suitable supply-circuit conductors Trolley and Ground; a plurality of main dynamo-electric machines respectively having armatures A1 and A2 that are provided with suitable power-transmission mechanisms 1 and 2 and also having main or exciting field windings F1 and F2 and auxiliary or commutating field windings C1 and C2; an auxiliary generator or exciter 3 that is driven from a truck axle 4 by means of a belt 5 or other suitable member; a plurality of main-circuit resistors 6 to 10, inclusive; a plurality of auxiliary circuit resistors 11 and 12; a plurality of main-circuit switches LS, S, M1, JR, R1, R2, R3, RR1, RR2, RR3, J, M2, G, SR and GR; a plurality of suitably mounted reversing-switch contact members RS1, RS2 and RS3, here conventionally illustrated, for the purpose of reversing the electrical relations within the main machines and the exciting machine respectively, and a change-over switch CO-1, illustrated in its assembled form in Fig. 2 and having an operative position $p$ corresponding to acceleration, a plurality of operative positions $q$ to $y$ corresponding to regeneration, a plurality of stationary control fingers 21 to 36, inclusive, and contact segments 37 to 42, inclusive, of configurations suitable for engaging the various control fingers in the desired order.

Each of the power-transmission mechanisms 1 and 2 is shown as comprising a pinion 13 that is rigidly mounted upon the axle 14 of the corresponding main armature and is adapted to mesh with a gear wheel 15 fixed upon a truck axle 16 which is thus driven by the corresponding main armature in the usual way.

The auxiliary exciting machine 3, as previously stated, is driven from a truck axle 4 which, consequently, causes the exciting armature 17 to rotate with the main-machine armatures A1 and A2. As will be understood, the armature 17 may be directly mechanically connected with one of the truck axles 16, if so desired. A series-related field winding 18 and a main and a regenerated-current-excited field winding 19 that are differentially disposed with respect to each other during the regenerative period, as indicated by the arrows, are provided for the exciting armature 17.

Since the particular type of auxiliary control system that is employed for governing the various circuits illustrated in Fig. 1 is not material to my present invention, in the interests of clarity and simplicity I have omitted the master controller and auxiliary circuits, which may be readily devised by those skilled in the art, for the purpose of governing the various switches, in accordance with the sequence of operation that is indicated in the chart, Fig. 3.

Inasmuch as the regenerative control circuits of my present invention are more important and novel than the accelerating circuits, I have illustrated the various contact segments of the change-over switch CO-1 in the respective regenerative positions, and the various accelerating circuits will be traced as though actually shown completed by the contact segments in question, it being understood that during acceleration, the various contact segments illustrated in Fig. 1 in reality occupy the positions corresponding to the dotted line $p$ of Fig. 2.

Assuming that the change-over switch CO-1 occupies its accelerating position $p$ and that the above-mentioned master controller (not shown) is moved to its initial accelerating position $a$, the switches LS, M1 and JR are closed, as indicated by line $a$ of the sequence chart.

Consequently, a circuit is established from the trolley through conductor 45, switch LS, resistor 6, conductor 46, switch M1, conductor 47, main armature A1, commutating field winding C1, control fingers 23 and 22 of the change-over switch CO-1 in its position $p$, conductor 48, reversing-switch contact members RS1 and main field winding F1; conductor 49, control fingers 27 and 28 of the change-over switch which are bridged by contact segment 39 thereof, conductor 50, resistor 7, conductors 51 and 52, switch JR, conductors 53 and 54, resistor 8, conductor 55, main armature A2, commutating field winding C2, conductor 56, control fingers 36 and 35 which are bridged by contact segment 42 of the change-over switch conductors 57 and 58, reversing-switch contact members RS2 and main field winding F2, and conductors 59 and 60 to the negative supply-circuit conductor Ground. Thus, the main machines are connected in series relation with the variable resistors 6, 7 and 8 across the supply circuit.

In position $b$ of the master controller, switch S is closed to short-circuit the resistor 6 and in positions $c$, $d$ and $e$, switches R1 to RR3, inclusive, are short-circuited in pairs, as indicated by the sequence chart, to thus finally connect the main machines in "full series" relation.

To effect the well-known bridging transition of the machines to parallel relation, the switch J is closed and the switches R1 to RR3 are opened, as indicated by the line $f$ of Fig. 3, thus directly interconnecting the main machines by means of a circuit that is completed from the conductor 49 through conductor 61, switch J, conductor 62, control fingers 34 and 33 of the change-over switch which are bridged by contact segment 41 thereof and conductor 63 to conductor 55. Switches M2 and G are next closed while the switch JR is opened as indicated in line $g$ of the sequence chart, whereby the positively-energized conductor 46 is connected through conductor 64, switch M2 and conductor 65 to the conductor 54 and thence to the main armature A2, while the closure of switch G connects the conductor 51 with conductor 66, which is connected through conductor 60 to ground. Finally, the switch J is opened, and the machines are connected in initial parallel relation with the resistors 7 and 8 respectively included in circuit therewith. In positions $h$, $i$ and $j$ of the master controller, the switches R1 and RR3 are again closed in suitable combinations to gradually short-circuit the corresponding resistors and effect acceleration of the main motors to "full-parallel" relation.

Assuming that the vehicle is traveling at a speed suitable for regenerative operation and that the change-over switch CO-1 has been thrown to its initial regenerative position $q$, the master controller, or other governing device, may be manipulated to position $a'$ whereby switches LS, S, M1, J, M2, G and GR are closed, as indicated by the line $a'$ of Fig. 3, and as shown in the simplified diagram, Fig. 8. Switch GR should be interlocked, through the familiar auxiliary-contact-member arrangement preferably, so that the switch G is insured of closing before the switch GR, thus preventing the connection of a low-resistance circuit including the armature A2 across the supply circuit before the main field windings are energized.

A main circuit is thus established from the trolley through conductor 45, switches LS and S, conductor 46, switch M1, main armature A1, commutating field winding C1, conductors 72 and 73, field winding 19 for the exciting armature 17, conductor 74, balancing or stabilizing resistor 9, conductor 75, control fingers 29 and 28 which are bridged by contact segment 39 of the change-over switch in its initial regenerative position $q$, conductor 50, resistor 7, conductor 51, switch G and conductors 66 and 60 to ground.

A parallel circuit is completed from the switch S through conductor 64, switch M2, conductors 65 and 54, resistor 8, conductor 55, main armature A2, commutating field winding C2, conductors 56 and 70, switch GR, balancing or stabilizing resistor 10 and conductor 71 to ground. The main momentum-driven dynamo-electric machine armatures A1 and A2 are thus respectively connected in circuit with the resistors 7 and 8, and the armature circuits as entities are connected in parallel relation across the supply circuit.

The main-field-winding circuits are established from the positive terminal of the auxiliary exciting armature 17 through conductor 76, reversing-switch contact members RS3, conductor 77, auxiliary field winding 18, conductor 78, control fingers 21 and 22, which are bridged by contact 37 of the change-over switch, conductor 48, reversing-switch contact members RS1 and main field winding F1, which is traversed by current in the same direction as the accelerating current, conductors 49 and 61, switch J, conductor 62, control fingers 34 and 35 which are bridged by contact segment 41 of the change-over switch in its position $g$, conductors 79 and 58, main field winding F2 in the same direction as that of the accelerating current, conductors 59 and 66, switch G, conductor 52, variable resistor 12, conductor 80, reversing-switch contact members RS3 and conductor 81 to the negative terminal of the auxiliary armature.

It should be particularly observed that the switch G simultaneously closes both a main-armature or regenerative circuit and the main-field-winding or exciting circuit, whereby a momentary current from the supply circuit traverses the main armatures and the field winding 19 for the auxiliary armature 17 to consequently build up the voltage of the axle-driven exciter in the proper direction to energize the main field windings F1 and F2 similarly to the energization thereof during the accelerating period, whereby the mechanical reversal of the main-field-winding connections that has been necessary in many regenerative systems of the prior art is dispensed with.

The importance of the simultaneous closure of the two circuits in question will be obvious from the following statements. If the main armature circuits were closed first, the supply-circuit conductors would be directly connected through the relatively low-resistance armature circuit and a heavy current surge would ensue, since the counter-electromotive force of the main armatures would be practically nil. On the other hand, if the main-field-winding circuit were closed first, a relatively heavy current would traverse the main field windings, since no check thereto would be offered by the field winding 19, and under high-speed conditions, unduly high voltages between commutator bars would be induced and "flashing" would probably occur.

By the use of the exciter machine 3, a predetermined limiting ratio between the main-armature and main-field-winding currents may be established, for example, if the differentially-related field windings 18 and 19 of the exciter have the same number of turns it will be impossible to generate more current from the main armatures than traverses the main field windings, irrespective of the regenerative speed. Again, if it is desired to limit the main-armature current to double that of the main field winding, the result may be accomplished by using one-half the number of turns in the field winding 19, as is provided in the series-related field winding 18.

The function of the balancing resistor 10 is to compensate for the resistance of the regenerated-current-excited field winding 19 for the auxiliary armature, which field winding is connected in series relation with the main armature A1. In case the circuits are still not sufficiently stabilized to prevent undesirable fluctuations of current, further resistance may be inserted in the respective main armature circuits, as illustrated by the complete resistors 9 and 10.

In position $b'$ of the master controller, all of the resistor short-circuiting switches R1 to RR3, inclusive, are closed, as indicated in the sequence chart to thus return the full complement of energy to the supply circuit.

Regulation of the exciter-armature voltage to compensate for any decrease of braking effort by reason of the gradual reduction of main-machine speed, may be effected by actuating the change-over switch CO-1 through its successive positions $q$ to $u$, inclusive, whereby, as clearly shown in Fig. 2, the control fingers 23 to 26 inclusive, successively engage contact segment 38, as indicated in Fig. 9, to thereby gradually short-circuit the resistor 11, which is connected directly across the regenerated-current-excited field winding 19 for the auxiliary armature 17, thus reducing the effectiveness of the field winding. The arrangement of parts is such that the inherent variation of currents in the series-related field winding 18, by reason of the gradual decrease in speed of the driving axle 4 and the above-mentioned change of current in the field winding 19, by reason of the manipulation of the resistor 11, causes the delivered voltage of the auxiliary armature 17, and, therefore, the main field winding excitation, to gradually increase as the machine speed decreases, whereby the machines operate below the above-mentioned limiting ratio of regenerated and exciting currents.

Furthermore, in position $t$ of the change-over switch, contact segment 40 thereof bridges control fingers 30 and 31, thus short-circuiting a portion of the main field-winding circuit resistor 12 and further aiding the desired change of main-machine excitation.

A substantially uninterrupted transition of the momentum-driven machines from parallel to series relation may then be effected in the following manner: by actuating the master controller to its position $d'$, switches RR1, RR2 and RR3 are opened, as shown in Fig. 10, to thus introduce resistance in the circuit of the armature A2; and by actuating the change-over switch CO-1 to its position $u$, the field strength of the exciter is somewhat reduced.

In position $e'$, the switch GR is opened to momentarily exclude the armature A2 from circuit, (see Fig. 11) and in position $f'$, the switch SR is closed to connect a shunting circuit, including the resistor 8, across the terminals of the armature A2, as shown in Fig. 12. The next step $g'$ serves to open the switch M1, whereby the main circuit is completed from the switch S, through conductor 64, switch M2, conductors 65 and 54, resistor 8, conductor 55, main armature A2, commutating field winding C2, conductors 56 and 83, switch SR, conductors 84 and 47, main armature A1, commutating field winding C1 and thence through conductors 72 and 73 and the auxiliary machine field winding 19, as previously described.

Furthermore, if necessary or desirable, the resistor 7 may also be included in circuit during the above-mentioned transition, as indicated by the line $e'$ of the sequence chart, the resistor being again short-circuited in position $f'$ of the master controller, while the corresponding resistor 8 is also excluded from circuit when the master controller reaches its position $g'$.

Further regulation of the exciter-machine circuits may be accomplished by actuating the change-over switch through its successive position $u$ to $y$, inclusive, whereby the shunting resistor 11 for the auxiliary field winding 19 is again gradually short-circuited, as indicated in Fig. 13, while a further section of the main-field-winding circuit resistor 12 is excluded from circuit upon the bridging of control fingers 31 and 32 by contact segment 40 in position $x$ of the change-over switch.

In some cases, it may be possible, by suitable design of the exciting machine, to secure an approximately uniform rate of braking without requiring any change in the resistors 11 and 12. Under such circumstances, the initial adjustmenet of the resistor 12, which is connected in circuit with the main field windings, will determine the rate of braking and the value of current to be returned to the supply circuit.

Referring to Fig. 4, the system shown embodies the principles of my present invention in conjunction with a relatively simple arrangement of circuits, whereby the main field windings F1 and F2 are always maintained on the negative or ground side of all the main armatures, which arrangement is particularly advantageous in connection with relatively high-voltage equipment, as is well-understood.

The system shown comprises the suply circuit and the main machines, as previously described, but no auxiliary exciting machine is employed, since the armature A2 is used during the regenerative period as an exciting source for the field winding of the regenerating armature A1; a main-circuit resistor 100 and auxiliary-circuit resistors 101 and 102; a plurality of main-circuit switches LS, R1, R2, R3, R4, S1, S2, P1, P2, P3 and G; and a change-over switch CO-2 which, in general, resembles the switch illustrated in Fig. 2 and which embodies a plurality of stationary control fingers 103 to 111, inclusive, and co-operating contact segments 115 to 119, inclusive.

In the present instance, the field winding F2 is divided into convenient sections F2$a$ and F2$b$ that are differentially related during the regenerative period, and reversing-switch contact members RS2$a$ and RS2$b$ are associated with the respective sections.

Assuming that the above-mentioned change-over switch occupies its accelerating position and that the master controller (not shown) is moved to its position $a$ to close the switches LS, R1, S1, S2 and P1, as indicated by the sequence chart, and as shown in the simplified diagram, Fig. 14, a main circuit is established from the trolley through conductor 125, switch LS, conductor 126; switch R1, conductor 127, the entire resistor 100, conductor 128, main armature A1, commutating field winding C1, conductors 129, 130 and 131, switch S1, conductors 132 and 133, switch P1, conductor 134, main armature A2, commutating field winding C2, reversing-switch contact members RS2$b$ and field-winding section F2$b$, conductor 135, control fingers 107 and 108 which are bridged by contact segment 117 of the change-over switch CO-2 in its accelerating position, conductor 136, reversing-switch contact members RS2$a$ and field winding F2$a$, conductors 137 and 138, switch S2, conductors 139 and 140, reversing-switch contact members RS1 and main field winding F1, conductor 141, 142 and 143 to ground. The motors are thus connected in initial series relation with the resistor 100 across the supply circuit, the field windings being located on the ground side of both armatures.

In positions $b$, $c$, $d$ and $e$ of the master controller, the various switches R1 to R4, inclusive, are suitably manipulated to gradually short-circuit the resistor 100 and effect acceleration of the main machines.

"Shunting" transition of the main machines is then effected by actuating the master controller through its positions $f$ and $g$, (see Fig. 15 and Fig. 16,) whereupon switches P3 and G are closed, thus simultaneously short-circuiting the main armature A1 and the main field winding F1, and then closing the switch P2 and opening the series-connecting switches S1 and S2. Under such conditions, one circuit is completed from the main armature A1 through commutating field winding C1, conductor 129, switch P2, and thence through conductor 140 and the main field winding F1, as previously described, whereas a second circuit is completed from the resistor 100 through conductor 144, switches P3 and P1, conductor 134, armature A2, commutating field winding C2, and thence through the sections of the main field winding F2, as previously traced, to conductor 138, whence circuit is completed through switch G and conductor 143 to ground. Thus, the motors are connected in initial parallel relation with the field windings on the ground side of the respective armatures, and subsequent actuation of the master controller through positions $h$, $i$ and $j$ serves to gradually short-circuit the resistor 100 and connect the motors in full-parallel relation.

To effect regenerative operation under suitable conditions, the contact members RS1 and RS2b are manipulated to reverse the corresponding field windings, the change-over switch CO-2 is actuated to its regenerative position, and the master controller is moved to its initial regenerative position $a'$ to close switches LS, G and R1, as indicated by the sequence chart, and as shown in Fig. 17. Thus, the subsequent regenerative circuit is established from the trolley, through switch LS, conductor 126, switch R1, conductor 127, resistor 100, conductor 128, main armature A1, commutating field winding C1, conductor 129 and 130, control fingers 109 and 108 which are bridged by contact segment 118 of the change-over switch CO-2, conductor 136, reversing-switch contact members RS2a and main field-winding section F2a in the opposite direction to that traversed by accelerating current, conductors 137 and 138, and switch G, when the master controller occupies position $b'$, to the ground conductor 143.

An exciting circuit is established from the positive terminal of the main armature A2 through conductor 147, control fingers 105 and 106, which are bridged by contact segment 116 of the change-over switch, conductors 148 and 138, switch G, conductor 142, any desired initial portion of the variable resistor 101, conductor 141, reversing-switch contact members RS1 and the reversed main field winding F1 in the same direction as traversed by the accelerating current, conductors 140 and 139, control fingers 111 and 110 which are bridged by contact segment 119 of the change-over switch, conductors 149 and 135, reversed field-winding section F2b in the same direction, and the commutating field winding C2 to the negative terminal of the main armature A2.

Thus, the armature A2 serves to excite the allied main field-winding-section F2b and the main field winding F1 of the other machine, while the main field winding F2a of the exciting machine is connected in series relation with the regenerating armature A1 and the field-winding-sections F2a and F2b are differentially related with respect to each other, as indicated by the arrows, thereby corresponding to the differentially-related field windings 18 and 19 of the auxiliary exciting machine that is shown in Fig. 1. Furthermore, the various field windings are again located on the ground side of the armatures, for a purpose already set forth.

After the completion of the above-mentioned exciting circuits, the master controller is actuated to its second position $b'$ to thereby close the resistor short-circuiting switches R2, R3 and R4 and permit full braking effort.

In the present instance also, it should be noted that a single switch G closes both the regenerative and the exciting circuits, for the purposes already set forth.

For effecting regulation of the exciting machine as the braking speed decreases, the resistor 102, which is connected across the regenerated-current-excited field-winding section F2a through control fingers 103 and 104 and contact segment 115 of the change-over switch, may be employed, as previously described in connection with Fig. 1, that is, by means of a suitable arrangement of movable contact members upon the change-over switch, or any other convenient method may be utilized. Similarly, the exciting-circuit resistor 101 may be gradually short-circuited, as indicated by the arrow-heads. See also Fig. 18.

In Fig. 6, a four-motor equipment is illustrated and one of the machine armatures is utilized during the regenerative period to excite the field windings of the other machines. The system shown comprises the supply-circuit conductors, trolley and ground; a plurality of dynamo-electric machines respectively having armatures A1, A2, A3 and A4, commutating field windings C1, C2, C3, C4 and main field windings F1, F2, F3 and F4; a plurality of main-circuit switches LS, R1, R2, R3, R4, M1, S, P and G; a variable main-circuit resistor 150; balancing main-circuit resistors 151 and 152, and variable exciting-circuit resistors 153 and 154; a change-over switch CO-3, of the above-described general form, embodying a plurality of control fingers 155 to 180 and 281 and 282 and a plurality of suitable cooperating movable contact segments 181 to 194, inclusive. The armature A4 corresponds to the exciting armature A2 of Fig. 4, and is provided with two exciting field-winding sections F4a and F4b that are associated with reversing-switch contact members RS4a and RS4b, respectively.

Assuming that the change-over switch CO-3 occupies its accelerating position and that a suitable master controller is moved to its initial accelerating position a to close switches LS, R1, M1, and S, as indicated by the sequence chart, a main circuit is established from the trolley through conductor 195, switches LS and R1, the entire resistor 150, conductor 196, switch M1, junction-point 197, where the circuit divides, one branch including conductor 198, main armature A1, commutating field winding C1, conductor 199, control fingers 176 and 177 which are bridged by contact segment 190 of the change-over switch CO-3 conductor 200, reversing-switch contact members RS1 and main field winding F1 and conductor 201 to junction-point 202, and the other branch including conductor 203, main armature A2, commutating field winding C2, control fingers 170 and 171 which are bridged by contact segment 187 of the change-over switch, conductor 204, reversing-switch contact members RS2 and main field winding F2, conductor 205, control fingers 175 and 174 which are bridged by contact segment 189 of the change-over switch, to junction-point 202, whence a common circuit is continued through conductors 206 and 207, switch S, conductor 208, control fingers 156 and 157 which are bridged by contact segment 193 of the change-over switch, conductors 209 and 210 to junction-point 211, where the circuit again divides, one branch traversing conductor 212, main armature A3, commutating field winding C3, control fingers 158 and 159 which are bridged by contact segment 181 of the change-over switch, conductor 213, reversing-switch contact members RS3 and main field winding F3, conductor 214, control fingers 166 and 167 which are bridged by contact segment 185 of the change-over switch, and conductor 215 to junction-point 216, and the other branch traversing conductor 217, main armature A4, commutating field winding C4, reversing-switch contact members RS4b and field-winding-section F4b, conductor 218, control fingers 165 and 164 which are bridged by contact segment 184 of the change-over switch, conductors 219 and 220, reversing-switch contact members RS4a and main field-winding section F4a, and conductor 221 to junction-point 216, whence a common circuit is completed through conductors 222 and 223 to ground.

Thus, the motors are initially connected in series-parallel relation with each other and in common series relation with the resistor 150 across the supply circuit.

In positions b to e, inclusive, of the master controller, the resistor short-circuiting switches R1 to R4, inclusive, are appropriately manipulated to gradually effect acceleration of the machines to the full-series-parallel relation.

To effect transition to parallel relation of the motors, the master controller is moved to position f, whereby the switch P is closed to shunt the machines having armatures A1 and A2, and in position g, switch S is opened while switch G is closed. Under such conditions, the conductor 206, which corresponds to the main armatures A1 and A2, is connected through conductor 228, switch G and conductors 229, 230 and 223 to ground, and another circuit is completed from the resistor 150 through conductors 225 and 226, switch P and conductor 227 to conductor 210 which corresponds to the armatures A3 and A4.

In positions h and i, of the master controller, the resistor 150 is again suitably short-circuited to finally effect full-parallel connection of the machines.

Under preliminary regenerative conditions, contact members RS1, RS2, RS3 and RS4b are reversed, the change-over switch CO-3 is actuated to its regenerative position and the master controller is moved to its position a' to close switches LS, R1 and S, as indicated by the sequence chart, and as shown in Fig. 19. However, no circuits are completed until the master controller is moved to its position b' to further close the switch P and then the main resistor-short-circuiting switches, whereby a main-field-winding excitation circuit is completed from the positive terminal of the armature A4 which, in this instance, acts as an exciting machine, conductor 217, junction-point 211, conductors 210 and 227, switch P, control fingers 155 and 156 which are bridged by contact segment 193 of the change-over switch in its regenerative position, conductor 208, switch S, conductors 207 and 206, junction-point 202, conductor 201, reversed main field winding F1 in the same direction as that of the accelerating current, conductor 200, control fingers 177 and 178 which are bridged by contact segment 191 of the change-over switch, conductors 236 and 205, reversed main field winding F2 in the same direction, conductors 204 and 237, control fingers 168 and 169 which are bridged by contact segment 186 of the change-over switch, conductors 238 and 214, reversed main field winding F3 in the same direction, conductor 213, control fingers 159 and 163 which are bridged by contact segment 183 of the change-over switch, variable resistor 154, conductor 218, reversed field winding section F4b in the same direction, and commutating field winding C4 to the negative terminal of the main armature A4. As in the previous cases, the switch P, which corresponds to the switch G of the hereinbefore-described systems, simultaneously closes both the main-armature and the field-winding circuits and, in the present case, a regenerative circuit is established from the trolley through conductor 195, switches LS and R1, resistor 150, conductors 225 and 226, switch P, conductors 227 and 210, junction-point 211, conductor 212, main armature A3, commutating field winding C3, control fingers 158 and 161 which are bridged by contact segment 182 of the change-over switch, conductors 240 and 220, main field-winding section F4a in the opposite direction from acceleration, conductor 221, junction-point 216 and conductors 222 and 223 to ground. The simplified circuit connections are shown in Fig. 20.

In position c' of the master controller, the switch M1 is also closed, whereby a further regenerative circuit is completed from the short-circuited resistor 150 through switch M1, junction-point 197, where the circuit divides, one branch including conductor 198, main armature A1, commutating field winding C1, conductors 199 and 241, control fingers 179 and 180 which are bridged by contact segment 192 of the change-over switch, balancing resistor 151 and conductor 242 to the negative conductor 229, and the other branch including conductor 203, main armature A2, commutating field winding C2, conductor 243, control fingers 172 and 173 which are bridged by contact segment 188 of the change-over switch, conductor 244, and balancing resistor 152 to the negative conductor 230. See also Fig. 21.

Thus, the armature A4 is utilized as an exciting machine for the main field windings of the other machines and for its own field-winding-section F4b, whereas the main field-winding-section F4a is energized by the regenerated current of the armature A3. As described in connection with Fig. 4, the field-winding-sections F4a and F4b are differentially related with respect to each other, as indicated by the arrows.

To regulate the operation of the exciting armature A4 during the regenerative period, the resistor 153, which is connected across the field-winding-section F4a through control fingers 282 and 281, and contact segment 194 of the change-over switch, may be suitably varied in a manner previously described, and, furthermore, the exciting-circuit resistor 154 may also be gradually short-circuited as the speed of the momentum-driven machines decreases.

I do not wish to be restricted to the specific circuit connections or arrangement of parts herein set forth, as various other modifications thereof may be effected without departing from the spirit and scope of my invention. I desire, therefore, that only such limitations shall be imposed as are indicated in the appended claims.

I claim as my invention:

1. In a system of control, the combination with a dynamo-electric machine having an armature and a field winding, of a second dynamo-electric machine connected to excite said field winding and partially energized from said armature, and a single switch for simultaneously completing the armature circuit and the exciting circuit.

2. In a system of control, the combination with a supply circuit and a plurality of dynamo-electric machines each having an armature and a plurality of field windings, of means for connecting the armature of one machine through a field-winding of the same and also of the other machine to the supply circuit, means for completing a circuit through the other armature and the remaining field-windings, and means for simultaneously closing both machine circuits.

3. In a system of control, the combination with a supply circuit and a dynamo-electric machine having an armature and a field winding, of a second dynamo-electric machine having an armature and a plural-section field winding, means for connecting the first-mentioned armature and one of said field-winding sections to the supply circuit, means for completing an exciting circuit through the second armature and the first-mentioned field winding, and a single switch for simultaneously closing both machine circuits.

4. In a system of regenerative control, the combination with a main momentum-driven dynamo-electric machine having an armature and a field winding, of an auxiliary exciting armature rotatable with the main machine and provided with a plurality of field windings respectively energized in accordance with main-armature and auxiliary armature current.

5. In a system of regenerative vehicle control, the combination with a main momentum-driven dynamo-electric machine having an armature and a field winding, of an auxiliary vehicle-axle-driven armature provided with a plurality of differentially-related field windings respectively energized in accordance with main-armature and auxiliary-armature current.

6. In a system of regenerative control, the combination with a main momentum-driven dynamo-electric machine having an armature and a field winding, of an auxiliary exciting armature rotatable with the main machine and provided with a plurality of field windings respectively energize in accordance with main-armature and auxiliary-armature current, and means for simultaneously closing the main-armature and the auxiliary-armature circuits.

7. In a system of regenerative vehicle control, the combination with a main momentum-driven dynamo-electric machine having an armature and a field winding, of an auxiliary vehicle-axle-driven armature provided with a plurality of differentially related field windings respectively energized in accordance with main-armature and auxiliary-armature current, and a single switch for simultaneously closing the main-armature and the auxiliary-armature circuits.

8. In a system of control, the combination with a plurality of main momentum-driven dynamo-electric machines adapted for both accelerating and regenerating operation and severally having armatures and field windings, of an auxiliary vehicle-axle-driven armature provided with a plurality of differentially-related field windings respectively energized during the regenerative period by main-armature and auxiliary-armature current, and a change-over switch for arranging the main-machine circuits for acceleration and regeneration and for connecting the auxiliary machine in circuit during the regenerative period.

9. In a system of control, the combination with a plurality of main momentum-driven dynamo-electric machines adapted for both accelerating and regenerating operation and severally having armatures and field windings, of an auxiliary vehicle-axle-driven armature provided with a plurality of differentially-related field windings respectively energized during the regenerative period by main-armature and auxiliary-armature current, a change-over switch for arranging the main-machine circuits for acceleration and regeneration and for connecting the auxiliary machine in circuit during the regenerative period, and a single switch for closing the main-armature and the auxiliary armature circuits.

In testimony whereof, I have hereunto subscribed my name this 18th day of May, 1917.

NORMAN W. STORER.